United States Patent

Maroschak

[11] 3,986,963
[45] Oct. 19, 1976

[54] SEPTIC TANK TEE

[76] Inventor: Ernest J. Maroschak, P.O. Box 878, Roseboro, N.C. 28382

[22] Filed: May 1, 1975

[21] Appl. No.: 573,750

Related U.S. Application Data

[62] Division of Ser. No. 299,448, Oct. 20, 1972, Pat. No. 3,904,228.

[52] U.S. Cl. .............................. 210/532 S; 210/170
[51] Int. Cl.² ........................................ C02B 1/00
[58] Field of Search ...................... 210/170, 532 S; 285/156, 158, 423, DIG. 16, 193; 151/21 R

[56] References Cited
UNITED STATES PATENTS

| | | | |
|---|---|---|---|
| 696,998 | 4/1902 | McLean | 151/21 R |
| 1,319,817 | 10/1919 | Wells | 285/193 X |
| 3,543,457 | 12/1970 | Budlong | 285/158 X |
| 3,630,370 | 12/1971 | Quina | 210/532 S |
| 3,662,918 | 5/1972 | Crawford et al. | 210/532 S |
| 3,709,527 | 1/1973 | Nations | 210/532 S |
| 3,781,041 | 12/1973 | Petzetakis | 285/423 X |

*Primary Examiner*—Charles N. Hart
*Assistant Examiner*—Robert H. Spitzer
*Attorney, Agent, or Firm*—Bell, Seltzer, Park & Gibson

[57] ABSTRACT

A plastic septic tank tee for use in a septic tank comprises an elongate tubular body member, a relatively short tubular branch member secured to the body member between the ends thereof and means carried by the branch member for aiding in anchoring and retaining the septic tank tee in operative position in the septic tank. The anchoring and retaining means preferably comprises a plastic split collar which is secured on the branch member and engages the outer side wall of the septic tank.

11 Claims, 5 Drawing Figures

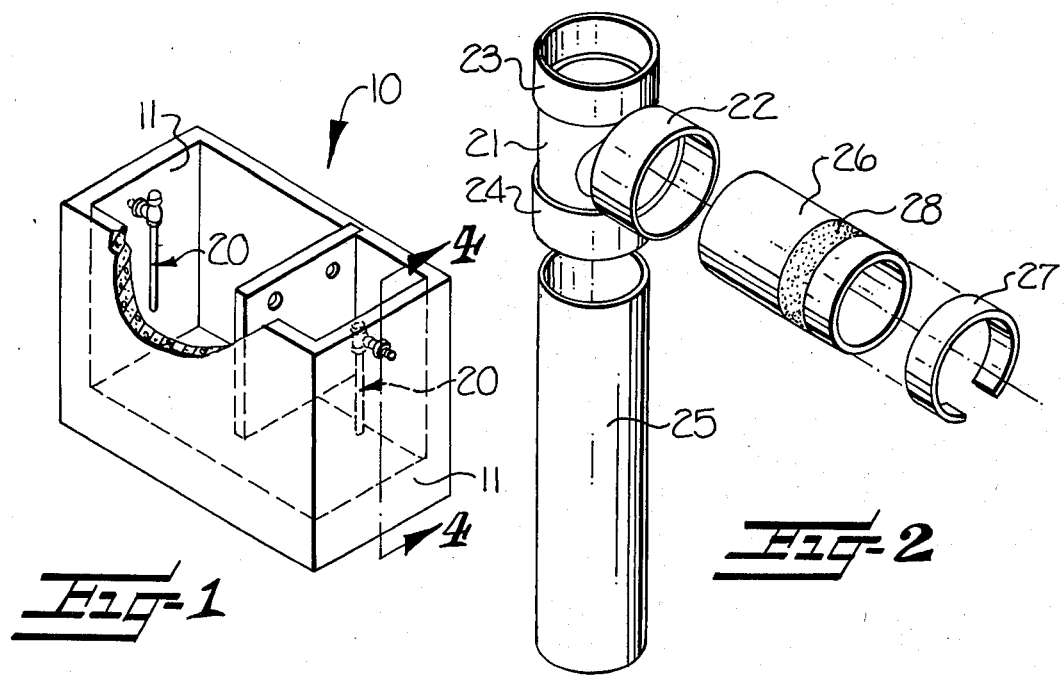
_Fig-1_
_Fig-2_
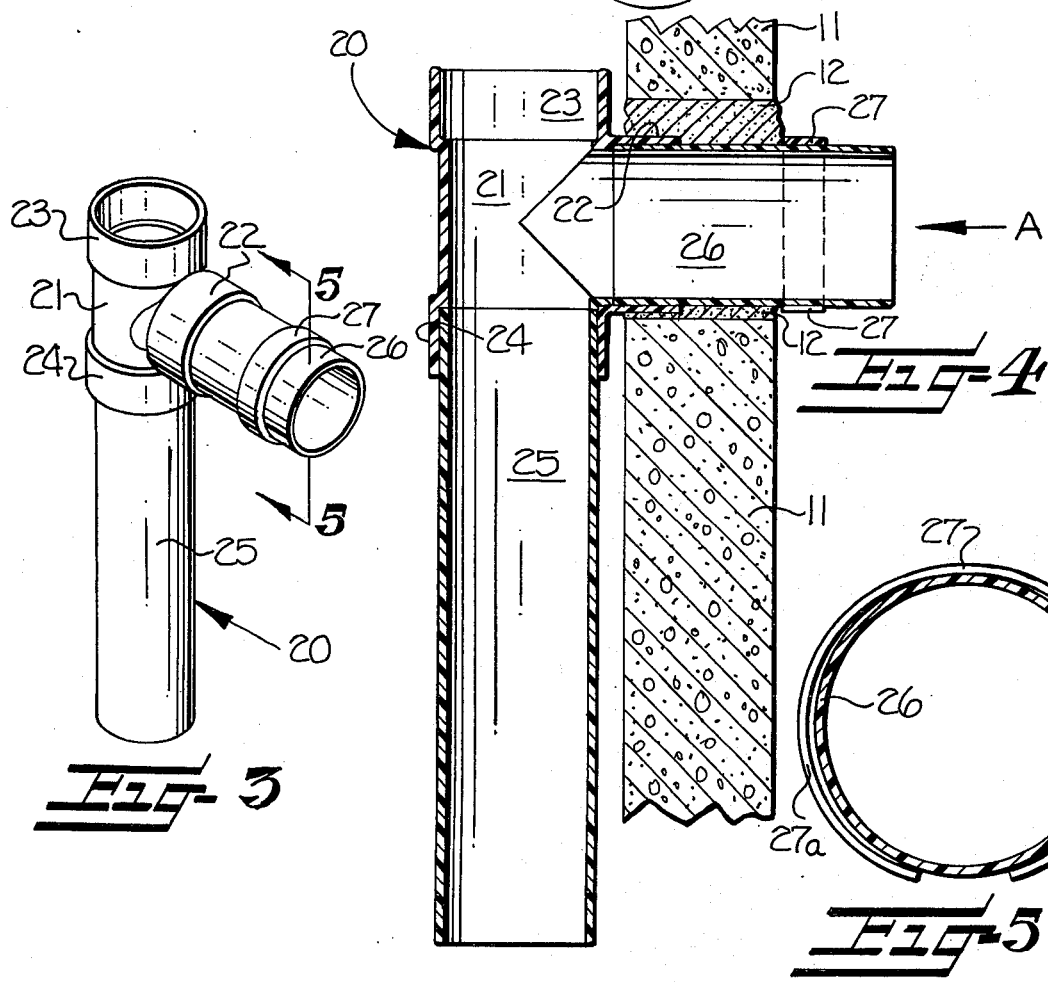
_Fig-3_
_Fig-4_
_Fig-5_

SEPTIC TANK TEE

This application is a division of my copending application Ser. No. 299,448, filed Oct. 20, 1972, entitled SEPTIC TANK TEE, now U.S. Pat. No. 3,904,228.

This invention relates to septic tanks and more particularly to an improved plastic septic tank tee for use in septic tanks. A septic tank tee is a generally T-shaped tubular fitting used at the inlet and/or outlet ports in a septic tank to conduct the flow of waste materials either into or from the septic tank in association with the connecting pipe lines.

Septic tank tees and the pipe lines used with septic tank installations have previously been made from clay or terra cotta. Septic tank tees of these materials are generally installed in position in the side wall of the septic tank by passing one portion thereof through a preformed hole in the side wall of the tank and then grouting the remaining space between the hole and the protruding portion of the septic tank tee with cement. Since clay and terra cotta pipes have relatively rough outer surfaces, a secure connection may be made between the tee and the septic tank wall by this method.

Recently, an increasing number of the pipelines used in septic tank installations have been made of plastic. Pipes of plastic have the obvious advantages over terra cotta of lightweight, low cost, low breakage, and easy handling. The use of a plastic septic tank tee in a septic tank, however, presents a problem in obtaining a satisfactory joint between the septic tank wall and the tee. A sturdy, permanent connection between the tee and the wall of the septic tank is essential in septic tank installations. After a certain amount of service, the connecting pipe lines may become clogged. In such instances it becomes necessary to clear the obstructions by rodding. The force of this rodding against the septic tank tee could easily displace the tee from its normally upright position in the tank or could completely dislodge the tee from the septic tank wall and the connecting pipeline. Such displacement or dislocation would necessitate the expense of exposing the tank to reopen the same and reset the tee in operative position.

Thus, it is a primary object of this invention to provide a plastic septic tank tee with means for securing and maintaining the tee in operative position in a wall of a septic tank.

It is a further object of this invention to provide a septic tank with a plastic septic tank tee securely mounted in a wall thereof.

Some of the objects of the invention having been stated, other objects will appear as the description proceeds, when taken in connection with the accompanying drawings, in which FIG. 1 is a perspective view of a septic tank with septic tank tees mounted therein according to the invention;

FIG. 2 is an exploded perspective view of a septic tank tee according to the invention showing the various component parts of the septic tank tee;

FIG. 3 is a perspective view of an assembled septic tank tee according to the invention;

FIG. 4 is a vertical sectional view taken along line 4—4 in FIG. 1; and

FIG. 5 is a vertical sectional view taken along line 5—5 in FIG. 3.

A septic tank tee is generally provided at the outlet of a septic tank to carry the treated fluid from the tank to a pipeline which is connected to the drainage field. If desired, a septic tank tee may also be provided at the inlet of the tank to receive waste material from the sewer line and deflect the same downwardly into the septic tank. As illustrated in FIG. 1 a septic tank 10, which is preferably made of concrete, has four vertical side walls, two opposite walls 11 having preformed holes in the upper portion thereof. Protruding through the holes in the opposing walls are septic tank tees 20.

As shown in FIGS. 2 and 3, the septic tank tee according to the illustrated embodiment of the invention includes four parts. The body member of the septic tank tee includes interconnected upper and lower portions, the lower portion being defined by an elongate length of plastic pipe 25 having open opposite ends, and the upper portion of the body member being defined by a substantially T-shaped tubular plastic tee fitting 21 having open opposite ends and a branch opening in the wall of the tee fitting intermediate the two opposite ends. The branch opening is defined by a relatively enlarged bell portion 22 integral with the tee fitting 21 and surrounding the branch opening. Bell portion 22 has an inside diameter adapted for receiving an end of a length of pipe of predetermined diameter therein. The open opposite ends of tee fitting 21 are defined by relatively enlarged upper and lower bell portions 23 and 24 which also are integral with the tee fitting 21. The upper bell portion 23 is left open and serves as a breather opening for proper operation of the septic tank system, as is well known. The length of plastic pipe 25 defining the lower portion of the body member is secured within lower bell portion 24 of the tubular plastic tee fitting 21 and terminates above the floor of the septic tank.

Projecting outwardly from the body of the septic tank tee is a branch member 26 defined by a relatively short length of pipe secured within the bell portion 22 of the tee fitting. Anchoring and retaining means is provided on and carried by the branch member at a predetermined distance from one end thereof. The anchoring and retaining means is provided with a shoulder adapted to engage the outer wall of the septic tank to aid in anchoring and retaining the septic tank tee in operative position within the septic tank.

According to the embodiment illustrated in FIGS. 2 and 3, the anchoring and retaining means is provided by a split plastic collar 27 mounted on the branch member 26 a short distance from the free end thereof with the end of the collar closest to the body member defining said shoulder. The collar 27 is, in essence, a segment cut from one end of a plastic pipe such as 25 or 26 which has thereafter been split and mounted on the branch member 26. Plastic collar 27 is normally cut from a length of pipe of the same diameter as the pipe to which the collar is applied. The collar is split longitudinally in order that it may be spread apart to increase the effective diameter thereof, permitting the collar to be positioned surrounding the branch member 26 and secured thereon. The collar is of a resilient plastic, so that when it is spread apart and mounted on the branch member 26, the inward bias of the plastic collar serves to grippingly engage the branch member. An adhesive, shown in FIG. 2 at 28, is applied to fixedly secure the collar 27 to the branch member, such adhesive normally being applied to the branch member prior to positioning the collar thereon. Thus, the inward bias of the collar serves to hold the collar at the desired location on the branch member until the adhesive has set.

As shown in FIG. 5, the collar 27, when mounted on the branch member 26 in its expanded state, substantially encircles the branch member, but desirably does not conform to the circular cross-section of the branch member at all points around the collar. When spread apart and mounted on the branch member, the collar assumes a slightly oval cross-section, positioning wall portions 27a of the collar spaced outwardly from the branch member a short distance with a void therebetween. These outwardly spaced wall portions 27a of the collar provide a greater outward reach of the innermost end of the collar serving to define the shoulder engaging the outer wall of the septic tank. This facilitates and insures that the shoulder defined by the inner end of the collar will be in position to engage the outer wall of the septic tank even though the collar is formed of relatively thin-walled material.

The plastic collar is positioned on branch member 26 a sufficient distance from the body member to accommodate the side wall of the septic tank therebetween, and is generally positioned on the branch member substantially closer to the free end of the branch member than to the body member.

The septic tank tee 20 is mounted in a side wall 11 of the septic tank with the body member extending generally vertically within the tank with the lower extremity thereof terminating above the floor of the septic tank, and with the branch member extending outwardly from the septic tank through an opening in the side wall. As shown in FIG. 4, the preformed hole in the side wall 11 of the septic tank is larger than the outside diameter of the branch member of the septic tank tee. In installing the septic tank tee, the branch member is positioned so that the collar 27 is adjacent the exterior surface of the side wall 11. The remaining space between the hole and the outer surface of the branch member of the tee is then filled by grouting with mortar or cement 12. With the septic tank tee 20 installed in the side wall of the septic tank according to the invention, collar 27 provides a shoulder which abuts and engages the outer wall of the septic tank.

After a septic tank installation has been in service for some time, the drainage fields and pipelines associated with the septic tank system may become clogged. In such instances, it becomes necessary to pass rods through the pipelines to remove the obstructions. As shown in FIG. 4, such rodding would take place in the direction indicated by arrow A, that is, through the connecting pipelines in a direction towards the septic tank. Unless the septic tank tee 20 is securely anchored in the wall of the septic tank, the tee may be dislodged from the wall by the forces exerted against the tee when the rodding apparatus reaches the septic tank tee. The abutting shoulder provided by the collar 27 provides an effective means of anchoring and retaining the tee in the septic tank wall.

In the drawing and specification, there has been set forth a preferred embodiment of the invention, and although specific terms are employed, they are used in a generic and descriptive sense only.

What is claimed is:

1. A septic tank having side walls with an opening in one of the same and a septic tank tee having an open-ended elongate tubular plastic body member vertically disposed within the septic tank, a relatively short open-ended tubular plastic branch member having its inner end integrally secured to the body member intermediate the ends thereof and extending outwardly from and beyond the septic tank through said opening in the side wall thereof, and said branch member having means located inwardly from its outer end for aiding in anchoring and retaining the septic tank tee in operative position with said septic tank and comprising shoulder means engaging the outer surface of said septic tank adjacent said opening therein.

2. A septic tank according to claim 1 wherein said anchoring and retaining means comprises a collar surroundingly mounted on said branch member with the end of said collar closest to said body member defining said shoulder means.

3. A septic tank according to claim 2 wherein said collar is of substantially uniform thickness with portions of said collar spaced outwardly from said branch member and defining a void therebetween to thus position said shoulder means a greater distance from said branch member to provide a greater outward reach of said shoulder means engaging the outer surface of said septic tank.

4. A septic tank according to claim 2 wherein said collar is substantially of oval cross-section with portions of the collar spaced outwardly from said branch member and defining a void therebetween to provide a greater outward reach of said shoulder means engaging the outer surface of said septic tank.

5. A septic tank according to claim 2 wherein said collar is split and is inherently biased inwardly and is in gripping engagement with said branch member.

6. A septic tank having side walls with an opening in one of the same and a septic tank tee having an open-ended plastic elongate tubular body member vertically disposed within the septic tank, a plastic relatively short open-ended tubular branch member having its inner end integrally secured to said body member intermediate the ends of the body member for fluid communication therewith and extending outwardly from and beyond said septic tank through said opening in the side wall thereof, and a split collar carried by said branch member in surrounding relation and located inwardly from the outer end of the branch member for aiding in anchoring and retaining the septic tank tee in operative position with said septic tank, the end of said split collar closest to said body member serving to define shoulder means extending outwardly from said branch member and engaging the outer surface of said septic tank, said split collar having circumferentially spaced apart end portions and an outer circumferential extent corresponding substantially to the outer circumference of said branch member carrying the same, and means securing said split collar to said branch member.

7. A septic tank according to claim 6 wherein said split collar is inherently biased inwardly with such biasing serving for grippingly engaging said branch member.

8. A septic tank according to claim 6 wherein said split collar has an inner and outer circumferential configuration differing from the outer circumferential configuration of said branch member to define certain wall portions of said collar spaced from said branch member so that said certain wall portions provide a greater outward reach of the end of the collar serving as said shoulder means.

9. A septic tank according to claim 6 wherein said split collar is of uniform thin wall construction with certain portions thereof having their inner surface spaced from and positioned outwardly of the said branch member and thus providing a greater outward reach of the end of the collar serving as said shoulder means.

10. A septic tank according to claim 6 wherein said body member comprises interconnected lower and upper portions, said lower portion comprising a length of plastic pipe, said upper portion comprising a substantially T-shaped tubular plastic tee fitting having a branch opening receiving said branch member, and wherein said means securing said split collar to said branch member is adhesive.

11. A septic tank having side walls with an opening in one of the same and a septic tank tee formed of plastic and having an open-ended plastic elongate tubular body member vertically disposed within the septic tank, a plastic relatively short open-ended tubular branch member secured to said body member intermediate the ends of the body member for fluid communication therewith and extending outwardly from said septic tank through said opening in the side wall thereof, and a collar of substantially uniform thickness secured to said branch member in surrounding relation intermediate the ends thereof for aiding in anchoring and retaining the septic tank tee in operative position with said septic tank, the end of said collar closest to said body member serving to define shoulder means extending outwardly from said branch member and engaging the outer surface of said septic tank, said collar having an inner and outer circumferential configuration differing from the outer circumferential configuration of said branch member to define certain wall portions of said collar spaced from said branch member and defining a void therebetween so that said certain wall portions provide a greater outward reach of the end of said collar serving as said shoulder means.

* * * * *